US007272500B1

(12) United States Patent
Walker

(10) Patent No.: US 7,272,500 B1
(45) Date of Patent: Sep. 18, 2007

(54) GLOBAL POSITIONING SYSTEM HARDWARE KEY FOR SOFTWARE LICENSES

(75) Inventor: William T. Walker, Evergreen, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 252 days.

(21) Appl. No.: 10/811,412

(22) Filed: Mar. 25, 2004

(51) Int. Cl.
*G01C 21/00* (2006.01)

(52) U.S. Cl. .................. 701/213; 701/207; 705/37; 705/59; 713/155; 713/156; 340/5.8

(58) Field of Classification Search ........ 701/207–214; 705/55–59; 713/155–156, 158, 164, 166–174; 340/5.2, 5.21, 5.28, 5.3, 5.8, 825.6, 825.49; 455/456.1

See application file for complete search history.

(56) References Cited

U.S. PATENT DOCUMENTS

| | | | |
|---|---|---|---|
| 4,288,659 A | 9/1981 | Atalla | 178/22.08 |
| 4,780,821 A | 10/1988 | Crossley | |
| 4,811,393 A | 3/1989 | Hazard | 380/21 |
| 4,888,800 A | 12/1989 | Marshall et al. | 380/21 |
| 4,937,863 A | 6/1990 | Robert et al. | 710/200 |
| 5,157,663 A | 10/1992 | Major et al. | 714/10 |
| 5,179,591 A | 1/1993 | Hardy et al. | 380/21 |
| 5,204,897 A | 4/1993 | Wyman | 380/4 |
| 5,206,903 A | 4/1993 | Kohler et al. | |
| 5,230,020 A | 7/1993 | Hardy et al. | 380/21 |
| 5,260,999 A | 11/1993 | Wyman | |
| 5,307,481 A | 4/1994 | Shimazaki et al. | 714/11 |
| 5,329,570 A | 7/1994 | Glassmacher et al. | 379/189 |
| 5,341,427 A | 8/1994 | Hardy et al. | 380/21 |
| 5,347,580 A | 9/1994 | Molva et al. | |
| 5,386,369 A | 1/1995 | Christiano | |
| 5,390,297 A | 2/1995 | Barber et al. | |
| 5,408,649 A | 4/1995 | Beshears et al. | 714/10 |
| 5,448,639 A | 9/1995 | Arazi | |
| 5,553,143 A | 9/1996 | Ross et al. | |
| 5,563,946 A | 10/1996 | Cooper et al. | |
| 5,671,412 A | 9/1997 | Christiano | 707/104 |

(Continued)

FOREIGN PATENT DOCUMENTS

EP 1 071 253 A1 1/2001

OTHER PUBLICATIONS

ADTech Engineering, IP Phone SI-160 User Manual (SCCP releases) Version 1.2 (2002), pp. 1-20

(Continued)

*Primary Examiner*—Gertrude A. Jeanglaude
(74) *Attorney, Agent, or Firm*—Sheridan Ross P.C.

(57) ABSTRACT

A system for validating a license to use a computational component, comprising (a) a GPS module 108 to determine one or more of GPS timing information and a geographic location of at least one of the computational component 400 and a key device 100 in communication with the computational component 400 and (b) a validation agent 128 and/or 404 operable to (a) compare the GPS timing information against the license expiration date and/or compare the geographic location with at least one predetermined geographic location permitted by the license and (b), when the GPS timing information is outside of the permissible license term and/or when the geographic location is not a permitted geographic location under the license, determine that the computational component 400 is not validly licensed.

43 Claims, 3 Drawing Sheets

U.S. PATENT DOCUMENTS

| | | | |
|---|---|---|---|
| 5,699,431 A | 12/1997 | Van Oorschot et al. | 380/30 |
| 5,708,709 A | 1/1998 | Rose | 705/59 |
| 5,717,604 A | 2/1998 | Wiggins | 709/229 |
| 5,742,757 A | 4/1998 | Hamadani et al. | |
| 5,745,576 A | 4/1998 | Abraham et al. | 380/25 |
| 5,745,879 A | 4/1998 | Wyman | 705/1 |
| 5,758,068 A | 5/1998 | Brandt et al. | 726/27 |
| 5,758,069 A | 5/1998 | Olsen | |
| 5,790,074 A * | 8/1998 | Rangedahl et al. | 342/357.13 |
| 5,790,664 A | 8/1998 | Coley et al. | 380/4 |
| 5,828,747 A | 10/1998 | Fisher et al. | |
| 5,905,793 A | 5/1999 | Flockhart et al. | |
| 5,905,860 A | 5/1999 | Olsen et al. | 395/187.01 |
| 5,940,504 A | 8/1999 | Griswold | 705/59 |
| 5,960,085 A | 9/1999 | de la Huerga | |
| 5,978,565 A | 11/1999 | Ohran et al. | 714/13 |
| 5,982,873 A | 11/1999 | Flockhart et al. | |
| 6,011,973 A * | 1/2000 | Valentine et al. | 455/456.6 |
| 6,023,766 A | 2/2000 | Yamamura | |
| 6,067,621 A | 5/2000 | Yu et al. | |
| 6,108,703 A | 8/2000 | Leighton et al. | 709/226 |
| 6,128,389 A | 10/2000 | Chan et al. | |
| 6,134,660 A | 10/2000 | Boneh et al. | |
| 6,148,415 A | 11/2000 | Kobayashi et al. | 714/15 |
| 6,163,607 A | 12/2000 | Bogart et al. | |
| 6,173,053 B1 | 1/2001 | Bogart et al. | |
| 6,192,122 B1 | 2/2001 | Flockhart et al. | |
| 6,502,079 B1 | 12/2002 | Ball et al. | 705/59 |
| 6,513,121 B1 | 1/2003 | Serkowski | 713/201 |
| 6,574,612 B1 | 6/2003 | Baratti et al. | 705/59 |
| 6,584,454 B1 | 6/2003 | Hummel et al. | 705/59 |
| 6,640,305 B2 | 10/2003 | Kocher et al. | |
| 6,675,208 B1 | 1/2004 | Rai et al. | |
| 6,765,492 B2 * | 7/2004 | Harris | 340/686.6 |
| 6,775,782 B1 | 8/2004 | Buros et al. | |
| 6,778,820 B2 * | 8/2004 | Tendler | 455/414.2 |
| 6,826,606 B2 | 11/2004 | Freeman et al. | 709/223 |
| 6,850,958 B2 | 2/2005 | Wakabayashi | 707/204 |
| 6,854,010 B1 | 2/2005 | Christian et al. | 703/223 |
| 6,883,095 B2 | 4/2005 | Sandhu et al. | |
| 6,920,567 B1 | 7/2005 | Doherty et al. | 726/22 |
| 6,928,166 B2 | 8/2005 | Yoshizawa | |
| 6,928,558 B1 | 8/2005 | Allahwerdi et al. | |
| 6,934,848 B1 | 8/2005 | King et al. | |
| 6,976,164 B1 | 12/2005 | King et al. | |
| 7,032,113 B2 | 4/2006 | Pendlebury | |
| 7,085,382 B2 | 8/2006 | Terao et al. | |
| 2001/0001268 A1 | 5/2001 | Menon et al. | |
| 2001/0013024 A1 | 8/2001 | Takahashi | |
| 2002/0001302 A1 | 1/2002 | Pickett | 370/352 |
| 2002/0017977 A1* | 2/2002 | Wall | 340/5.28 |
| 2002/0038422 A1 | 3/2002 | Suwamoto et al. | |
| 2002/0052939 A1 | 5/2002 | Lee | |
| 2002/0083003 A1 | 6/2002 | Halliday | 705/52 |
| 2002/0087892 A1 | 7/2002 | Hideyo | |
| 2002/0104006 A1 | 8/2002 | Boate et al. | |
| 2002/0107809 A1 | 8/2002 | Biddle et al. | |
| 2002/0112186 A1 | 8/2002 | Ford et al. | |
| 2002/0125886 A1* | 9/2002 | Bates et al. | 324/307 |
| 2002/0154777 A1* | 10/2002 | Candelore | 380/258 |
| 2002/0164025 A1 | 11/2002 | Raiz et al. | 380/231 |
| 2002/0174356 A1 | 11/2002 | Padole et al. | 713/200 |
| 2002/0176404 A1 | 11/2002 | Girard | 370/352 |
| 2002/0188656 A1 | 12/2002 | Patton et al. | |
| 2002/0194473 A1 | 12/2002 | Pope et al. | |
| 2003/0005427 A1 | 1/2003 | Herrero | 717/178 |
| 2003/0013411 A1 | 1/2003 | Uchiyama | |
| 2003/0055749 A1 | 3/2003 | Carmody et al. | |
| 2003/0144959 A1 | 7/2003 | Makita | |
| 2003/0149874 A1* | 8/2003 | Balfanz et al. | 713/168 |
| 2003/0208449 A1 | 11/2003 | Diao | |
| 2004/0044629 A1 | 3/2004 | Rhodes et al. | 705/59 |
| 2004/0044630 A1 | 3/2004 | Walker et al. | 705/59 |
| 2004/0044631 A1 | 3/2004 | Walker et al. | 713/200 |
| 2004/0044901 A1 | 3/2004 | Serkowski et al. | 713/200 |
| 2004/0054909 A1 | 3/2004 | Serkowski et al. | 713/200 |
| 2004/0054930 A1 | 3/2004 | Walker et al. | 705/59 |
| 2004/0073517 A1 | 4/2004 | Zunke et al. | |
| 2004/0078339 A1* | 4/2004 | Goringe et al. | 705/59 |
| 2004/0103324 A1 | 5/2004 | Band | |
| 2004/0128551 A1* | 7/2004 | Walker et al. | 713/201 |
| 2004/0162998 A1 | 8/2004 | Tuomi et al. | |
| 2004/0166878 A1* | 8/2004 | Erskine et al. | 455/456.1 |
| 2004/0172367 A1* | 9/2004 | Chavez | 705/59 |
| 2004/0181695 A1* | 9/2004 | Walker | 713/202 |
| 2004/0181696 A1* | 9/2004 | Walker | 713/202 |
| 2004/0199760 A1* | 10/2004 | Mazza et al. | 713/150 |
| 2004/0260589 A1 | 12/2004 | Varadarajan et al. | |
| 2005/0086174 A1 | 4/2005 | Eng | |
| 2005/0202830 A1* | 9/2005 | Sudit | 455/456.1 |
| 2005/0246098 A1* | 11/2005 | Bergstrom et al. | 701/213 |
| 2006/0036894 A1 | 2/2006 | Bauer et al. | |

OTHER PUBLICATIONS

"The Cricket Indoor Location System: An NMS Project @ MIT LCS" at http://nms.lcs.mit.edu/projects/cricket (Jul. 31, 2002), pp. 1-5.

Roger Clarke, "centrelink Smart Card Technical Issues Starter Kit Chapter 7" (Apr. 8, 1998) at http://www.anu.edu.au/people/Roger.Carke/DV/SCTISK.html, pp. 1-3.

Datakey, "Securing a Virtual Private Network with Smart Card Technology" available at www.datakey.com, pp. 1-8.

"Smart Card Authentication" at http://msdn.microsoft.com/library/en-us/security/security/smart_card_authentication.asp (Aug. 2002), pp. 1-2.

"Smart Card Interfaces" at http://msdn.microsoft.com/library/en-us/security/security/smart_card_interfaces.asp (Aug. 2002), p. 1.

"Primary Service Provider" at http://msdn.microsoft.com/library/en-us/security/security/primary_service_provider.asp (Aug. 2002), p. 1.

"Introducing Smart Cards to the System" at http://msdn.microsoft.com/library/en-us/security/security/introducing_smart_cards_to_the_system.asp (Aug. 2002), p. 1.

"Accessing a Smart Card" at http://msdn.microsoft.com/library/en-us/security/security/accessing_a_smart_card.asp (Aug. 2002), p. 1.

"Smart Card Resource Manager" at http://msdn.microsoft.com/library/en-us/security/security/smart_card_resource_manager.asp (Aug. 2002), p. 1.

"Smart Card User Interface" at http://msdn.microsoft.com/library/en-us/security/security/smart_card_user_interface.asp (Aug. 2002), p. 1.

"Smart Card Service Providers" at http://msdn.microsoft.com/library/en-us/security/security/smart_card_service_providers.asp (Aug. 2002), p. 1.

"Base Service Providers" at http://msdn.microsoft.com/library/en-us/security/security/base_service_providers.asp (Aug. 2002), p. 1.

"Building an ISO7816-4 APDU Command" at http://msdn.microsoft.com/library/en-us/security/security/building_an_iso7816_4_command.asp (Aug. 2002), pp. 1-2.

"Vendor Wrapper Service Provider" at http://msdn.microsoft.com/library/en-us.security/security/vendor_wrapper_service_provider.asp (Aug. 2002), pp. 1-2.

"Global Control of All Buying and Selling Now Possible," *Discerning the Times Digest Newsbytes*, vol. 1, Iss. ! (Jan. 2000), available at http://www.discerningtoday.org/members/Digest/2000Digest/January/Global%20Control.htm, 2 pages.

NEC Infrontia Corporation Press Release Establishment of "SmartCardInfrontia" solutions for "IC card," (Mar. 13, 2002), 4 pages.

Smart Card Alliance, "Industry News: Cubic Introduces New Mobile Ticketing Machine" (Jul. 3, 2003), available at http://www.smartcardalliance.org/industry_news/industry_news_item.cfm?itemID=852, 2 pages.

Smart Card Alliance, "Industry News: Cubic Corp. Introduces New National Security and Homeland Defense" (Sep. 9, 2002), available at http://www.smartcardalliance.org/industry_news/industry_item.cfm?itemID=310, 2 pages.

Motorola Press Release, "ERG Motorola Alliance Receives Award For Smart Card" (Jun. 6, 2000), available at http://www.motorola.com/LMPS/pressreleases/page888.htm, 3 pages.

Datakey: "Securing a Virtual Private Network with Smart Card Technology"; Aug. 1, 2002; available at www.datakey.com pp. 1-8.

U.S. Appl. No 10/775498; Gilman.

Arsys, "Public Key Infrastructure," (Feb. 4, 2001), available at http://www.transactiontrust.com/technicaindex.html, 4 pages.

Articsoft Limited, "Public Key Infrastucture (PKI) FAQs" (Feb. 2, 2003), available at http://www.articsoft.com/wp_pki_faq.htm, 5 pages.

"Digital Cinema Key management Messages," Draft 1 (Aug. 8, 2002), pp. 1-9.

Entrust Inc., "Entrust Authority Security Manager"; avaiable at http://www.entrust.com/authority/manager/index.htm; 23 pages; 2004.

Giswold, Robert S., "Get Smart: The Coming Revolution of Smart Cards," Journal of Property Management (May/Jun. 1997), 5 pages.

Info Merchant Store, "VeriFone 2000, MS/DUKPT/STD Pin Pad, New" (printed Feb. 17, 2004), avaiable at http://www.merchantamerica.com/creidtcardterminals/index.php?ba=product_enlarge&product=9632, 1 page.

Infosec Engineering, "Building a Corporate Public Key Infrastructure" (1999), available at http://www.infoseceng.com/corppki.htm, 20 pages.

LockStream Corporation, "Catalyst DRM Service Platform"; available at http://www.lockstream.com/products_spcm.php, 1 page; 2003.

LockStream Corporation, "Lockstream KeyDRM"; available at http://www.lockstream.com/products_1gm.php, 2 pages; 2003.

LockStream Corporation, "Lockstream OMA 1.0 DRM Client", available at http://www.lockstream.com/products_sprm.php, 2 pages; 2003.

LockStream Corporation, Catalyst DRM Service Platform Architecture, Vers. 1.0 (Nov. 2003), pp. 1-28.

NetLingo Dictionary of Internet Words, "Smart Card" (1995-2004), available at http://www.netlingo.com/lookup.cfm?term=smart+card, 2 pages.

Novell®, "Certificate Server: Public Key Infrastructure," White Paper (1999), pp. 1-10.

Rankl, Wolfgang, "Smart Card Handbook", available at http://www.wrank.de/SCH/SCH.html, 8 pages; 1998-2004.

Russinovich, Mark, Inside Encrypting Fily System, Part 1, Windows & .NET Magazine (Jun. 1999), available at http://www.winntmag.com/Articles/Index.cfm?ArticleID=5387 &Key=Internals, 4 pages.

Russinovich, Mark, Inside Encrypting Fily System, Part 2, Windows & .NET Magazine (Jul. 1999), available at http://www.winntmag.com/Articles/Index.cfm?ArticleID=5592 &Key=Internals, 5 pages.

Security Config, Back Up Your Encrpting File System Private Key in Windows 2000 Download; avaiable at http://www.scurity-config.com/software/alerts/back_up_your_encrypting_file_system_private_key_in_windows_2000.html, 2 pages; 2003.

SSH Communications Security Corp., "Enabling Virtual Public Networks with Public Key Infrastructure," White Paper (Jan. 2004), pp. 1-9.

Streetman, Kibbee K. et al., "Public Key Infrastructure: Resources, Requirements and Recommendations," ATI IPT Special Report 00-06 (Apr. 2000), p. 145.

Sun Developer Network, "Smart Card Overview," Sun Microsystems, Inc. (1994-2004), avaiable at http://java.sun.com/products/javacard/smartcards.html, 2 pages.

VeriFone Inc., "VeriFone Payment Solutions: Point-of-Sale PINpads" (1997-2004), available at http://www.verifone.com/products/printers_peripherals/html/pinpad_family.html, 1 page.

Whatis.com Target SearchTM, "PKI" (Jan. 13, 2004), available at http://whatis.techtarget.com/definition/0,2989893,sid9_gci214299,00.html, 4 pages.

* cited by examiner

GLOBAL POSITIONING SYSTEM HARDWARE KEY FOR SOFTWARE LICENSES

FIELD OF THE INVENTION

The present invention relates generally to software and/or hardware, and more particularly, to a license validation system which enables or disables software and/or hardware.

BACKGROUND OF THE INVENTION

Software piracy costs software manufacturers hundreds of millions annually in lost sales. Software piracy can take many forms. Although the most common form is to make unlawful copies of software, other forms include unlawfully enabling and using unpaid for software features in otherwise validly licensed software and using validly licensed software outside of permissible geographic parameters. In the latter situation, globally sold software has different pricing structures based on different geographic regions. The differing pricing structures depend on a variety of factors, including exchange rate, demand, and the socioeconomic status of the region. For example, software are often sold at higher prices in the U.S., Japan, South Korea, and Europe but at lower prices in lesser developed countries such as China. Obviously, there is a great financial incentive to buy "gray market" software in China when they are destined for use in the U.S., Japan, South Korea, or Europe.

One method uses serial number information (e.g., medium access control or MAC address) to associate licensed software with corresponding hardware and uses differing hardware identifiers for differing price regions. In this method, a valid license file is required to run a computational component. The license file contains a serial number that must be present on the hardware that is to execute the licensed software for the license to be valid and the software to be executable. In telecommunication applications, for example, the serial number of the control processor must be in the license file for the control processor to run the licensed software. The hardware identifiers are differing versions or ranges of the serial numbers, such that a specified region has a serial number of a particular format or within a particular range. When the system determines whether a valid license file is present, one of the checks is to determine whether or not the license has expired based on the system clock value and another is to determine for a stored region code set by the manufacturer that the serial number is correct for the corresponding region. This method is discussed in copending U.S. patent applications entitled "Securing Feature Activation in a Telecommunication System", Ser. No. 09/357,679, filed Jul. 20, 1999, to Serkowski; "License Modes in Call Processing", Ser. No. 10/232,508, filed Aug. 30, 2002; "Remote Feature Activator Feature Extraction", Ser. No. 10/232,906, filed Aug. 30, 2002; "Flexible License File Feature Controls", Ser. No. 10/231,999; "License File Serial Number Tracking", Ser. No. 10/232,507; "Licensing Duplicated Systems", Ser. No. 10/231,957; "Software Licensing for Spare Processors", Ser. No. 10/232,647; "Temporary Password Login", Ser. No. 10/387,182; and "Ironclad Notification of License Errors", Ser. No. 10/405,176; each of which is incorporated herein by this reference, and is currently being implemented commercially in Communication Manager™ by Avaya, Inc.™.

The use of the system clock setting to determine whether or not the license has expired can be circumvented by the licensee. As will be appreciated, software licenses can be limited or unlimited in duration. Licenses that are limited in duration are often much less expensive to purchase than those that have longer durations or unlimited durations. By adjusting the system clock setting, an unscrupulous licensee can indefinitely extend the duration of a limited duration license beyond its otherwise permissible duration and thereby gain a substantial and illegal windfall.

Moreover, the use of a region code or location feature coupled with a specific serial number provides only weak security against geographic software piracy. The mechanism addresses only gray market hardware issues. It does not address gray market software concerns.

SUMMARY OF THE INVENTION

The present invention is directed to solving these and other needs. According to the present invention, positional and/or temporal awareness of a key device and/or computational component attempting to validate the existence of a valid license is used during the license validation process.

In one embodiment of the present invention, a method for validating an intended use of a computational component is provided that includes the steps of:

(a) receiving Global Positioning System (GPS) information from a GPS receiver, the GPS information comprising one or more of (i) a geographic location and (ii) a clock setting, the geographic location being associated with the location of the computational component and/or a key device in communication with the computational component;

(b) performing one or more of the following steps:
 (i) comparing the geographic location with the predetermined geographic location permitted by the license; and
 (ii) comparing the clock setting with the expiration date of the license; and (c) when the geographic location is not a permitted geographic location under the license and/or when the clock setting is outside of the permissible term of the license, determining that use of the computational component is not permitted. When the clock setting is within the permissible license term, the geographic location is a permitted geographic location under the license, and/or other criteria are satisfied, the intended use of the computational component is valid. By using the GPS timing information to determine whether or not the license has expired rather than the system clock setting, the licensee is unable to extend the license beyond its otherwise permissible term. By determining the geographic location of the computational component and/or key device, the methodology can prevent the gray market use of the computational component.

The geographic location may be determined by any suitable technique, with a location determination by a Global Positioning System or GPS receiver being preferred due to its accuracy (within 100 meters), low cost, and ready availability. For more efficient processing, the GPS coordinates, which are typically expressed as a pairing of latitude and longitude, are converted into a region code by mapping the coordinates against a conversion table. The predetermined geographic location permitted by the license can be expressed as one or a number of region codes. Alternatively, the determination of proper geographic use of the computational component can be based on the absence of the region code corresponding to the current geographic location from a set of region codes. Typically, the GPS module is located in the key device, which is commonly configured as a dongle. The preferred type of dongle is a smart card.

The key device is typically required to activate the computational component. In other words, the computational component cannot be operated or executed unless the key device is in communication with the component.

To ensure that a valid key device is used to activate or execute the computational component, the key device is preferably authenticated by the computational component using suitable authentication information (e.g., a serial number associated with the key device and/or computational component). To be successfully authenticated, the serial number provided by the key device must match a serial number stored in the computational component, typically in a license file. Unless properly authenticated, the key device is not recognized by the computational component.

The key device can be configured to prohibit operation over a large network. A dishonest user can set up a computational system such that the computational component is running in a different region or country than the region or country where the key device is located. Although having a key device in one region to activate hardware/software in another distant region is a great inconvenience, such license abuse is not inconceivable if the cost savings to the user are large.

To further illustrate this embodiment, an operational description of a preferred configuration of the embodiment is provided. In the configuration, the licensed application makes periodic smart card queries to validate the license. In response to a query, the smart card translates the location determined by the GPS receiver into a region code and returns the region code to the licensed application along with the serial number. In this configuration, the license file would specify the region code(s) in which the software is licensed to operate based on what the customer ordered. If the region code returned to the application were not an allowed region code as defined in the license file, the software would not function. The smart card query from the licensed application can include the region code from the license. The smart card would then only return a serial number response if the GPS-determined position matched the region code in the query. Although such smart cards may not be inexpensive (approximately $200 per copy by today's pricing), for medium and high value software the expense can be justified if the cost differential between regions is significant. GPS chips are expected to drop dramatically in cost as they become mass-market items in cell phones and other mobile devices.

These and other advantages and features of the invention will become apparent from the following description of the invention taken together with the drawings.

DETAILED DESCRIPTION

Figure 1:
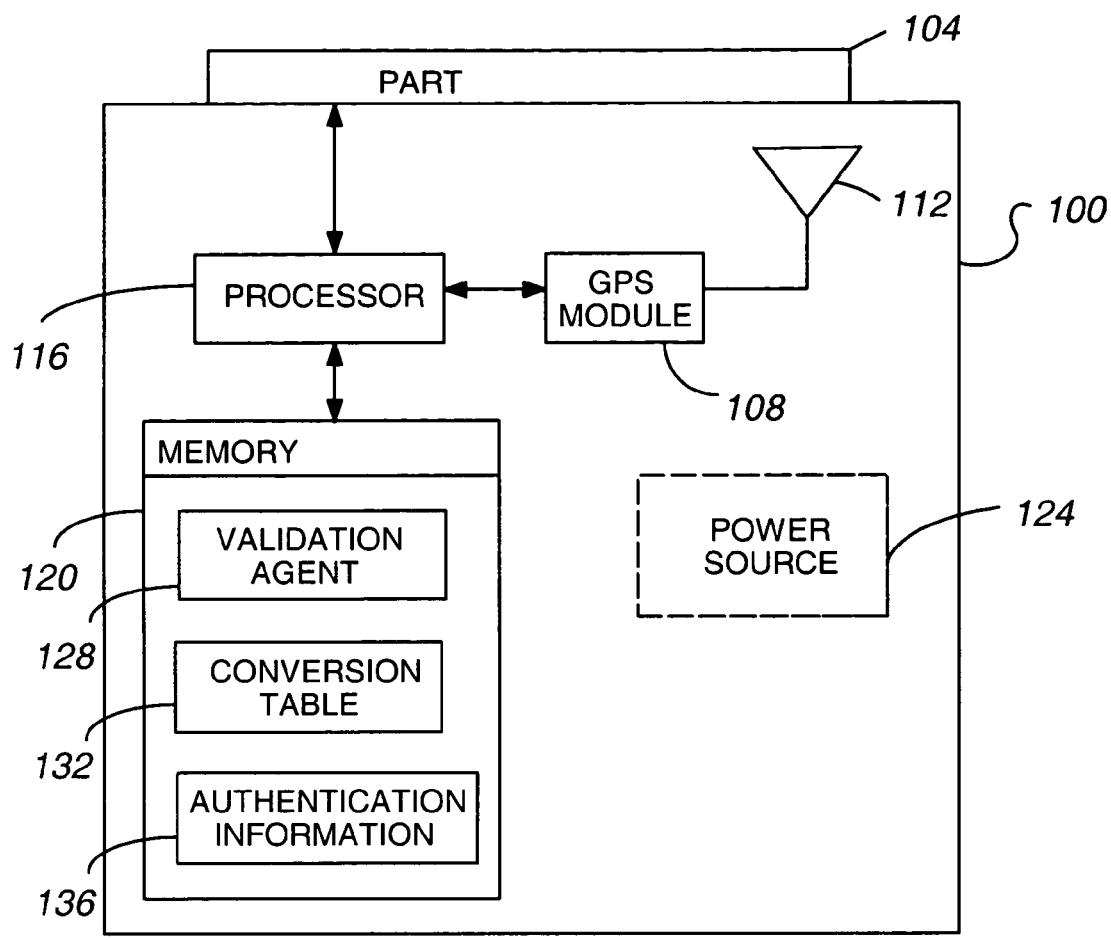
FIG. 1 is a block diagram representation of a dongle according to an embodiment of the present invention.
Figure 4:
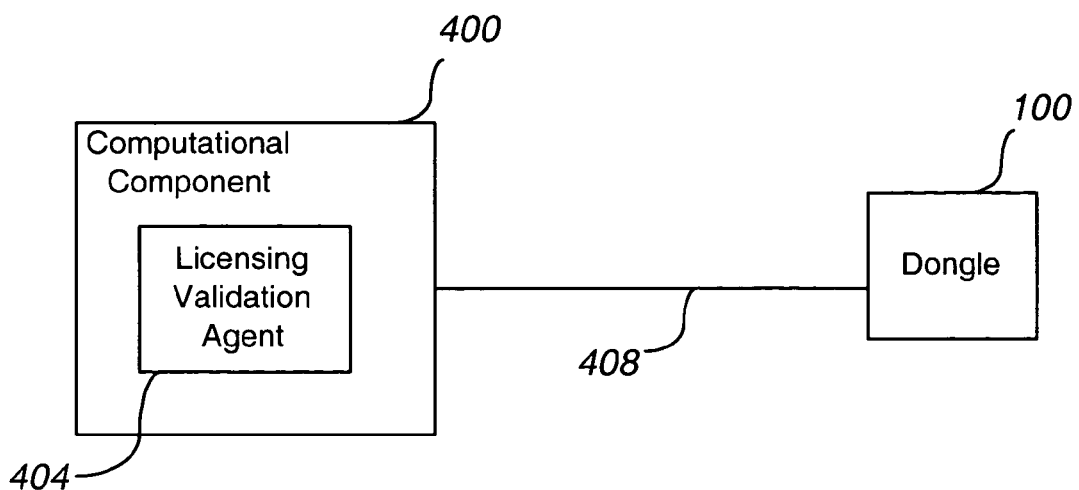
FIG. 4 is a block diagram representation of the dongle of FIG. 1 in communication with the computational component performing license validation.

Referring to FIG. 1, a dongle 100 of one embodiment of the present invention is depicted. The dongle 100 includes a port 104, a Global Positioning System or GPS module 108 coupled to an antenna 112, a processor 116, a memory 120 and an optional power source 124. As can be seen from FIG. 4, the dongle 100 communicates with a computational component 400 attempting to validate the existence of a valid license.

The port 104 of the dongle 100 typically connects to a port on the computational component 400 attempting to successfully validate the existence of a valid license for the intended operation of the computational component. The computational component 400 can be any entity capable of performing a task or executing instructions, e.g., a logic-containing board or chip such as an application specific integrated circuit or ASIC, a (control) processor, software, etc. In one configuration, the computational component 400 is a license-controlled telecommunication application. The port 104 may be adapted to be connected to a parallel port, a serial port, or any other type of port which may be available for data transfer, including a universal serial bus (USB) port.

The GPS module 108 can be any suitable software and/or hardware for receiving GPS signals and determining the current GPS timing information (e.g., a clock setting including one or more of time of day, day of month, month of year, and year) and the module's current location expressed in GPS coordinates (e.g., a latitude and longitude pairing). The GPS module 108 is in communication with the antenna 112 to receive the GPS signals.

The processor 116 can be any functional unit that interprets and executes instructions or processes coded instructions and performs a task. A processor typically includes an instruction control unit and an arithmetic and logic unit. Typically, the processor 116 is a microprocessor.

The memory 120 can be any suitable medium containing addressable storage space. The memory can be volatile storage and/or nonvolatile storage and can be read-only and/or random access. Typically, the memory is in the form of EEPROM.

The power source 124, which is optional, can be any suitable power supply. The power source is optional in that power could be received entirely from the computational component with which the dongle 100 is engaged or from a separate power supply.

The memory 120 includes a dongle validation agent 128 to interact with the computational component 400 and GPS module 108 during the license validation process and various data structures, including the conversion table 132, which maps GPS coordinates against region codes, and authentication information 136, which authenticates the dongle 100 to the computational component 400. The dongle validation agent 128 provides to a licensing validation agent 404 in the computational component 400 (FIG. 4) the authentication information 136, GPS timing information, and a region code (after mapping the GPS coordinates against the conversion table 132). The conversion table 132 typically is a listing of GPS coordinate ranges (e.g., a range of latitudes and a corresponding range of longitudes) against a corresponding region code. The authentication information 136 typically includes a unique identifier associated with the dongle 100 and/or computational component, such as a serial number, a MAC address, a secret and/or public algorithm and/or key, a digital certificate, and the like. Preferably, authentication is done using a secret, such as a secret algorithm, key, and/or certificate. Authentication is important as it prevents an unauthorized dongle from being used with the computational component. In a preferred configuration, the identifier is a serial number of a board in the computational component.

Nothwithstanding the specific configuration of the dongle 100 in FIG. 1, it is to be understood that the dongle can be in a multitude of other configurations. The dongle can be any hardware key that attaches or otherwise communicates with a computational component and that must be present (or in communication with the component) to run or execute a particular piece of software and/or operate hardware. It may be programmable or non-programmable. The dongle can be a smart card, PCI board, or other electronic device.

Figure 2:
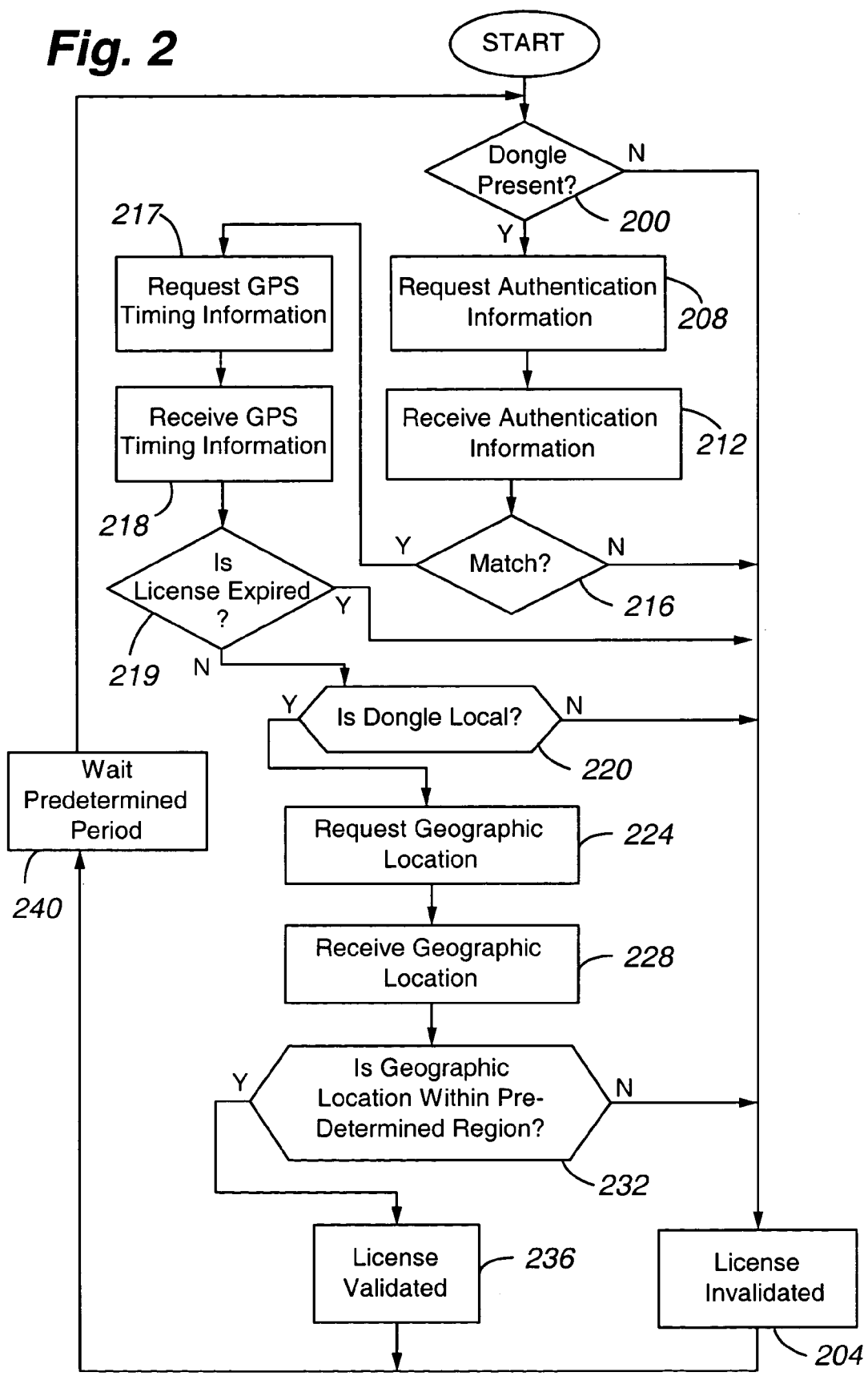
FIG. 2 is a flow chart illustration of the operational steps performed by a license validation agent in a computational component seeking license validation.

The joint operation of the licensing validation and dongle validation agents 404 and 128 will now be described with reference to FIGS. 2 and 3. FIG. 2 describes the operation of the licensing validation agent 404 while FIG. 3 the operation of the dongle validation agent 128.

Referring to FIG. 2, the licensing validation agent 404 first determines in decision diamond 200 whether or not the dongle 100 is present or in communication with the computational component 400. If the dongle 100 is not in communication with the component 400, the agent 404 determines in step 204 that the license is invalid. The consequences of such a determination depend on the application but can include completely disabling the software, disabling only selected features of the software, providing a warning to administration followed by complete or partial disablement of the software after a determined period, and the like. If the dongle 100 is in communication with the component 400, the agent 404 proceeds to step 208.

In step 208, the agent 404 requests authentication information from the dongle validation agent 128. In step 300 of FIG. 3, the dongle validation agent 128 receives the request and, in step 304, retrieves the authentication information and sends the information to the licensing validation agent 404.

In decision diamond 216 (FIG. 2), the licensing validation agent 404 compares the authentication information received from the dongle validation agent 128 with the authentication information stored in the memory (not shown) of the component 400. If the differing sets of authentication information do not match, the agent 404 proceeds to step 204. If they are identical, the agent 404 proceeds to step 217.

In step 217, the validation agent 404 requests GPS timing information from the dongle validation agent 128. In step 305 of FIG. 3, the dongle validation agent 128 receives the request and, in step 306, obtains the GPS timing information from the GPS module 108. The GPS timing information is sent to the validation agent 404 in step 307. When the GPS timing information is received by the validation agent 404 in step 218, the validation agent 404 in decision diamond 219 compares the timing information (e.g., clock setting) against the expiration date of the license. When the tinting information corresponds to a time after the expiration date, the agent 404 proceeds to step 204. When the timing information corresponds to a time before the expiration date and within the license term (e.g., after the start time of the license term), the agent 404 concludes that the license is unexpired and proceeds to decision diamond 220.

In decision diamond 220, the agent 404 determines if the dongle 100 is "local" to the computational component 400. As will appreciated, a dishonest user can set up a computational system such that the computational component 400 is running in a different region or country than the region or country where the dongle 100 is located. Although having a dongle 100 in one region to activate hardware/software in another distant region is a great inconvenience, such license abuse is not inconceivable if the cost savings to the user are large. To address this concern, the dongle 100 is configured to prohibit operation over a large network. Specifically, it can be configured to operate only as a local device without network capabilities. For example, the dongle 100 is not allowed to have an IP or MAC address that is not within a range of IP addresses or MAC addresses, respectively, defining the computational component or a network or subnetwork containing the component or may be required to have an IP address that is the same as a network interface card (not shown) associated with the computational component 400 (but can have a port number that is different from the port number of the card). Alternatively, the communication protocol between the computational component 400 and the dongle 100 could be designed to work only in a low-latency environment, such that the protocol would fail if the physical separation (as embodied by the communication medium 408) between the component 400 and the dongle 100 (FIG. 4) were too great. For example, a maximum time delay between the time a request is made by the component 400 to the dongle 100 and the time a response to the request is received by the component 400 from the dongle 100 may be specified. When the time delay between request and response equals or exceeds the maximum time delay, the dongle 100 is not considered to be local to the computational component. Likewise when the time delay is less than the maximum time delay, the dongle 100 is considered to be local.

When the dongle 100 is not found to be local to the component 400, the agent 404 proceeds to step 204.

When the dongle 100 is found to be local to the component 400, the agent 404 proceeds to step 224. In step 224, the agent 404 requests geographic location information from the dongle validation agent 128. In step 308 of FIG. 3, the request is received by the dongle validation agent 128. In steps 312, 316, and 320 of FIG. 3, the dongle validation agent 128 respectively obtains the geographic coordinates from the GPS module 108, converts the geographic coordinates into a corresponding region code by mapping the coordinates against the conversion table 132, and sends the region code to the licensing validation agent 404.

Returning again to FIG. 2, the agent 404 in decision diamond 232 determines whether the dongle's geographic location is within a predetermined region or collection of region codes. As will be appreciated, regions having similar pricing structures can be grouped together for purposes of acceptable areas of operation for software purchased in any of the similarly priced regions. Moreover, when the computational component is purchased in a region having a higher pricing structure it can be used in different regions having a lower pricing structure but not vice versa. Thus, if a customer purchased software at a lower price in China, it could not use the software in the U.S. where the software is selling at a higher price. However, if the customer purchased the software in the U.S. it could use the software in China. If not, the agent 404 proceeds to step 204. If so, the agent 404 proceeds to step 236 and determines that the license has been successfully validated. This determination permits the computational component to operate as permitted by the terms of the license.

After either of steps 204 or 236, the agent 404 proceeds to step 240 and waits a predetermined period. After the predetermined period, the validation process described above is repeated. The duration of the predetermined period depends on the application.

A number of variations and modifications of the invention can be used. It would be possible to provide for some features of the invention without providing others.

For example, the division of the various functions performed by the validation agents 128 and 404 can be different. For example, the dongle validation agent 128 can perform authentication (steps 208-216), locality determination (step 220), and/or geographic location permissibility (decision diamond 232) and notify the licensing validation agent 404 of the result.

Figure 3:
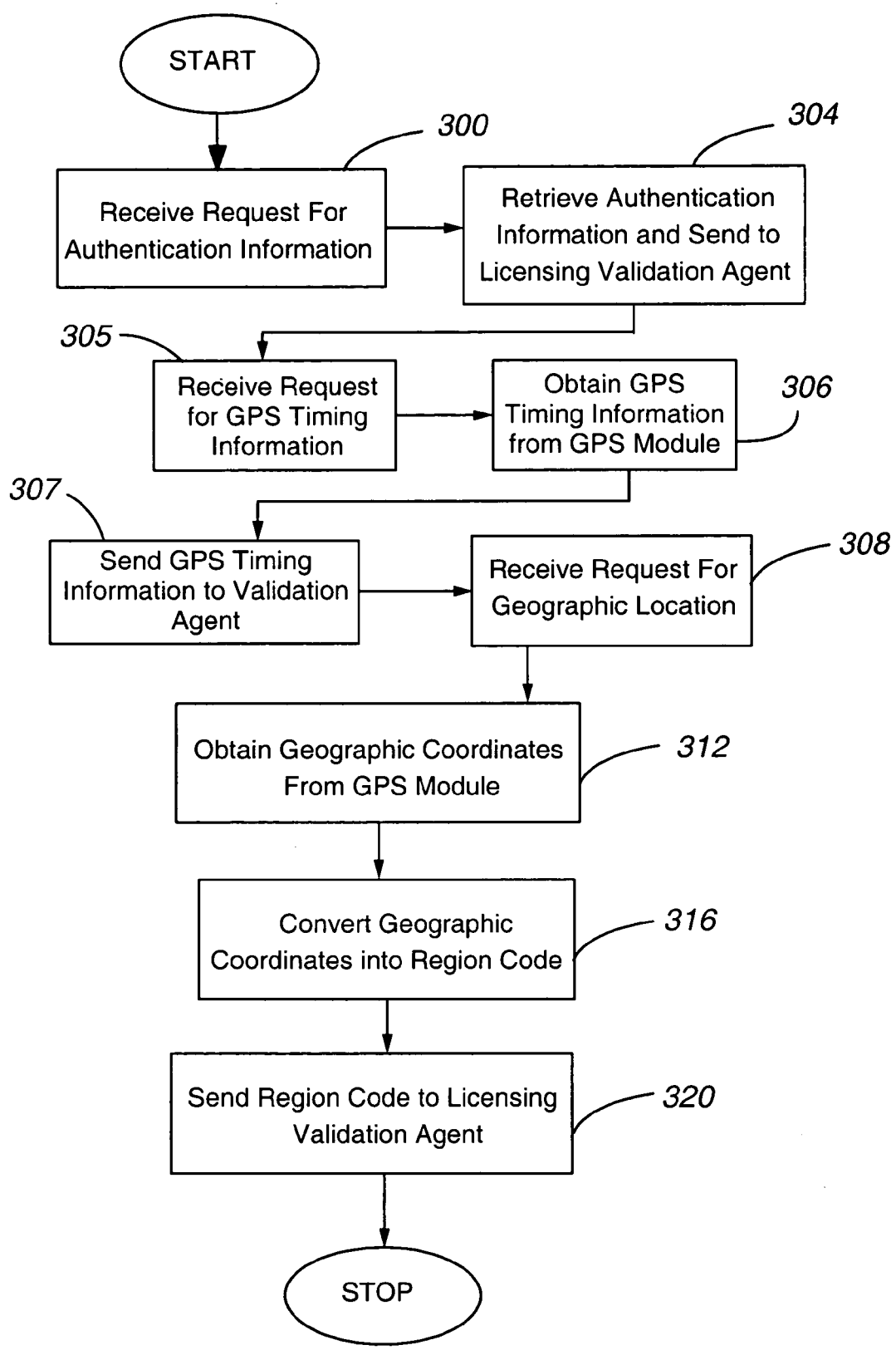
FIG. 3 is a flow chart illustration of the operational steps performed by a validation agent in the dongle of FIG. 1.

The steps of FIGS. 2 and 3 can be performed in a different order. For example, steps 208-216 can be performed after decision diamond 220. Steps 224-232 can be performed before either of steps 208-216 and decision diamond 220.

The licensing validation agent and dongle validation agent can be implemented as software, hardware, or a combination thereof. The dongle validation agent can, for example, be implemented as firmware.

In another embodiment, the GPS module is located in the computational component and a key may or may not be used. In this embodiment, the licensing validation agent interfaces directly with the GPS module and maps the GPS coordinates to a collection of region codes.

In yet another embodiment, the requirements for a permissible use of the computational component are not stipulated by a license. For example, the requirements can be stipulated in laws, regulations, policies or rules.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for determining whether an intended use of a computational component is permitted, comprising:
   (a) determining a geographic location of a key device in communication with and physically separate from the computational component, the key device containing a location module for determining wirelessly geographic location relative to a selected coordinate system;
   (b) comparing the determined geographic location with at least one predetermined permitted geographic location permitted by a license; and
   (c) when the determined geographic location is not a permitted geographic location under the license, determining that use of the computational component is not permitted.

2. The method of claim 1, wherein the key device is a dongle, wherein the location device is a satellite-based location determining module, and further comprising:
   (d) when the determined geographic location is a permitted geographic location under the license, a licensing validation agent in the computational component determining that use of the computational component is permitted.

3. The method of claim 2, wherein the determining step (a) further comprises:
   determining Global Positioning System or GPS coordinates of the key device; and
   converting the GPS coordinates into a region identifier.

4. The method of claim 3, wherein the permitted geographic location is one or more region identifiers and wherein in the determining step (c) the determined geographic location is a permitted geographic location when the region identifier identified in the converting step is included in the one or more region identifiers.

5. The method of claim 1, wherein a permitted use is defined by a license and further comprising:
   (d) a licensing validation agent in the computational component determining whether the key device is in communication with the computational component;
   (e) when the key device is not in communication with the computational component, the licensing validation agent in the computational component determining that the computational component is not validly licensed; and
   (f) when the key device is in communication with the computational component, the licensing validation agent in the computational component determining that the computational component is validly licensed.

6. The method of claim 1, wherein a permitted use is defined by a license and further comprising:
   (d) a licensing validation agent in the computational component authenticating the key device; and
   (e) when the key device is not authenticated successfully, the licensing validation agent in the computational component determining that the computational component is not validly licensed.

7. The method of claim 1, wherein a permitted use is defined by the license and further comprising:
   (d) a licensing validation agent in the computational component determining whether the key device is local to the computational component; and
   (e) when the key device is not local to the computational component, the licensing validation agent in the computational component determining that the computational component is not validly licensed.

8. The method of claim 7, wherein the key device is configured to operate only as a local device without network capabilities.

9. The method of claim 8, wherein the key device is not allowed to have an IP and/or MAC address that is within a range of IP addresses and/or MAC addresses, respectively, defining the computational component and/or a network and/or subnetwork containing the component.

10. The method of claim 8, wherein the key device is required to have an IP address that is the same as an IP address of a network interface card associated with the computational component but can have a port number that is different from the port number of the card.

11. A computer readable medium comprising processor-executable instructions to perform the steps of claim 1.

12. A logic circuit comprising an algorithm operable to perform the steps of claim 1.

13. The method of claim 7, wherein a communication protocol between the computational component and the key device is designed to work only in a low-latency environment, whereby the protocol would fail if the physical separation (relative to a communication medium connecting the computational component with the key device) were too great.

14. The method of claim 13, wherein, when a time delay between a request and a response thereto equals and/or exceeds a maximum time delay, the key device is not considered to be local to the computational component and, when the time delay is less than the maximum time delay, the dongle is considered to be local.

15. A system for validating a license to use a computational component, comprising:
   a locating module to determine, wirelessly, a geographic location relative to a selected coordinate system of a key device containing the module, the key device being physically separate from and in communication with the computational component; and
   a validation agent operable to (a) compare the determined geographic location with at least one predetermined permitted geographic location permitted by the license and (b) when the determined geographic location is not a permitted geographic location under the license, determine that the computational component is not validly licensed.

16. The system of claim 15, wherein the validation agent is in the computational component, wherein the key device is a dongle, wherein the location device is a satellite-based location determining module, and wherein the validation is further operable to (c) when the determined geographic location is a permitted geographic location under the license, determining that the computational component is validly licensed.

17. The system of claim 16, wherein the determined geographic location is initially expressed in Global Positioning System or GPS coordinates and the validation agent is further operable to (c) convert the GPS coordinates into a region identifier.

18. The system of claim 15, wherein the permitted geographic location is one or more region identifiers and wherein the determined geographic location is a permitted geographic location when the region identifier is included in the at least one predetermined region identifier.

19. The system of claim 15, wherein the validation is further operable to (c) determine whether the key device is in communication with the computational component; (d) when the key device is not in communication with the computational component, determine that the computational component is not validly licensed; and (e) when the key device is in communication with the computational component, determine that the computational component is validly licensed.

20. The system of claim 15, wherein the validation agent is further operable to (c) authenticate the key device and (d) when the key device is not authenticated successfully, determining that the computational component is not validly licensed.

21. The system of claim 15, wherein the validation agent is further operable to (c) determine whether the key device is local to the computational component and (d) when the key device is not local to the computational component, determining that the computational component is not validly licensed.

22. The system of claim 15, wherein the validation agent is located in the key device.

23. The system of claim 15, wherein the validation agent is located in the computational component.

24. The system of claim 15, wherein the key device is configured to operate only as a local device without network capabilities.

25. The system of claim 24, wherein the key device is not allowed to have an IP and/or MAC address that is within a range of IP addresses and/or MAC addresses, respectively, defining the computational component and/or a network and/or subnetwork containing the component.

26. The system of claim 24, wherein the key device is required to have an IP address that is the same as an IP address of a network interface card associated with the computational component but can have a port number that is different from the port number of the card.

27. The system of claim 15, wherein a communication protocol between the computational component and the key device is designed to work only in a low-latency environment, whereby the protocol would fail if the physical separation (relative to a communication medium connecting the computational component with the key device) were too great.

28. The system of claim 15, wherein the key device is a dongle and wherein, when a time delay between a request and a response thereto equals and/or exceeds a maximum time delay, the key device is not considered to be local to the computational component and, when the time delay is less than the maximum time delay, the dongle is considered to be local.

29. A method for validating a license to use a computational component, comprising:
   (a) providing a key device to validate the license when in communication with the computational component, the key device being physically separate from and connected to the computational component;
   (b) a licensing validation agent in the computational component determining whether the key device is local to the computational component; and
   (c) when the key device is not local to the computational component, the licensing validation agent in the computational component determining that the computational component is not validly licensed.

30. The method of claim 29, further comprising:
   (d) the key device determining a geographic location of the key device while in communication with the computational component;
   (e) comparing the determined geographic location with at least one predetermined permitted geographic location permitted by the license; and
   (f) when the determined geographic location is not a permitted geographic location under the license, determining that the computational component is not validly licensed.

31. The method of claim 30, wherein the determining step (d) comprises:
   determining a set of satellite-based coordinates of the key device; and
   converting the coordinates into a region identifier.

32. The method of claim 31, wherein the set of satellite-based coordinates are Global Positioning System coordinates.

33. The method of claim 30, further comprising:
   (g) the licensing validation agent in the computational component authenticating the key device; and
   (h) when the key device is not authenticated successfully, the licensing validation agent in the computational component determining that the computational component is not validly licensed.

34. The method of claim 30, wherein the permitted geographic location is one or more region identifiers and wherein in the determining steps (d) and (f) the determined geographic location is a permitted geographic location when the region identifier identified in the converting step is included in the one or more region identifiers.

35. The method of claim 30, further comprising:
(g) the licensing validation agent in the computational component determining whether the key device is in communication with the computational component;
(h) when the key device is not in communication with the computational component, the licensing validation agent in the computational component determining that the computational component is not validly licensed; and
(i) when the key device is in communication with the computational component, the licensing validation agent in the computational component determining that the computational component is validly licensed.

36. The method of claim 29, wherein the key device is not local when an electronic address of the key device is not contained in a predefined set of electronic addresses.

37. The method of claim 29, wherein the key device is not local when a time delay between the exchange of communications between the key device and computational component exceeds a selected time delay.

38. A computer readable medium comprising processor-executable instructions to perform the steps of claim 29.

39. A logic circuit comprising an algorithm operable to perform the steps of claim 29.

40. The method of claim 29, wherein the key device is required to have an IP address that is the same as an IP address of a network interface card associated with the computational component but can have a port number that is different from the port number of the card.

41. The method of claim 29, wherein a communication protocol between the computational component and the key device is designed to work only in a low-latency environment, whereby the protocol would fail if the physical separation (relative to a communication medium connecting the computational component with the key device) were too great.

42. The method of claim 29, wherein the key device is a dongle, wherein, when a time delay between a request and a response thereto equals and/or exceeds a maximum time delay, the key device is not considered to be local to the computational component and, when the time delay is less than the maximum time delay, the dongle is considered to be local.

43. The method of claim 29, further comprising:
(d) a licensing validation agent in the computational device receiving a clock setting from the key device;
(e) the licensing validation agent in the computational device comparing the clock setting with an expiration date of the license;
(e) when the clock setting is within the permissible term of the license, the licensing validation agent in the computational device determining that use of the computational component is permitted; and
(f) when the clock setting is not within the permissible term of the license, the licensing validation agent in the computational device determining that use of the computational component is not permitted.

\* \* \* \* \*